N. HOLMAN.
MIXING MACHINE.
APPLICATION FILED MAR. 11, 1912.
1,040,328.
Patented Oct. 8, 1912.
Fig-1-
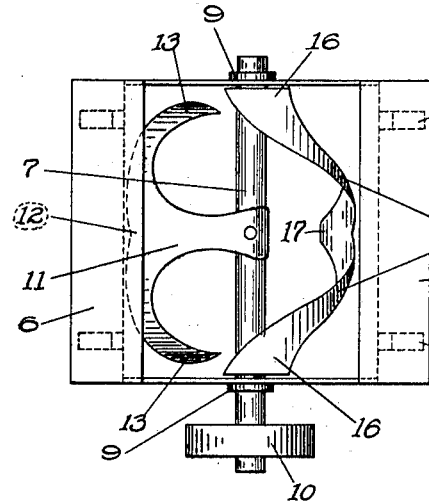
Fig-2-
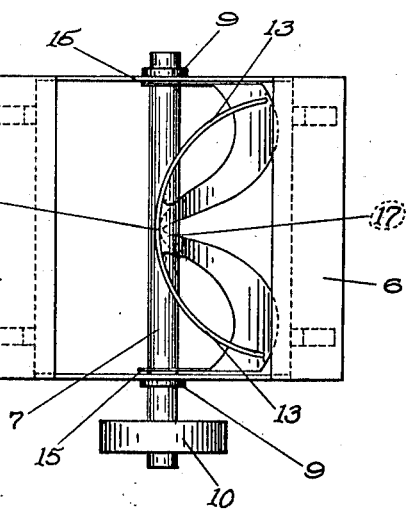
Fig-3-
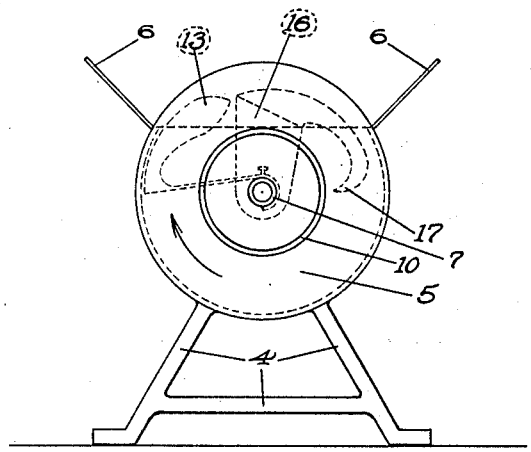
Witnesses—
Thomas F. Morgan, Jr.
Gustave T. Fraenckel
Inventor—
Nicholas Holman
By Morgan & Rubinstein
Attys—
COLUMBIA PLANOGRAPH CO., WASHINGTON, D. C.

UNITED STATES PATENT OFFICE.

NICHOLAS HOLMAN, OF CHICAGO, ILLINOIS.

MIXING-MACHINE.

1,040,328.  Specification of Letters Patent.  Patented Oct. 8, 1912.

Application filed March 11, 1912. Serial No. 683,022.

*To all whom it may concern:*

Be it known that I, NICHOLAS HOLMAN, a citizen of the United States, residing at Chicago, in the county of Cook and State of Illinois, have invented a new and useful Improvement in Mixing-Machines, of which the following is a specification.

The object of my invention is to provide a machine for mixing confectioners' dough and other adherent material requiring a rapid and thorough amalgamation of all its parts.

The manner in which I accomplish my object is described in the following specification and illustrated in the accompanying drawing in which:—

Figures 1 and 2 are plans, the rotatable blades being shown in two opposite positions. Fig. 3 is an end elevation, the blades being indicated by partly dotted lines.

In the drawings 4 indicates the supporting legs of my device, and 5 the cylindrical case fixed on said legs. The top of this case 5 is open and has outwardly inclined flanges 6 to facilitate the insertion and removal of material. Extending through the case is a shaft 7 rotatably supported in bearings 8 in the ends of the case. On one end of this shaft is a driving pulley 10. Secured on the center portion of the shaft within the case, is a double winged blade 11. The central outer edge 12 of this blade is adapted to scrape the central interior surface of the case and wings 13 are curved inward in the form of a crescent as shown in Fig. 2. Another blade 14, is attached at the ends 15 to the shaft close to the ends of the case as shown in Figs. 1 and 2. These ends 15 extend radially from the shaft the edges being adapted to scrape the ends of the case. From the radial extensions 17 this blade is bent sharply inward and forms an arch which is curved forward and downward, the center of the arch forming a hook 17 as shown in Figs. 1 and 3.

When my device is constructed as described and illustrated its operation is as follows:—The confectioners' dough or other material to be mixed is placed in the case and the shaft rotated by a motor or other power, the blades being moved in the direction of the arrow. As the shaft is rotated the blade 11 lifts the material from the bottom to the top, and the wings turn it over from the ends to the center. The blade 14 lifts the material from the bottom to the top, and turns it from the center to the ends; the contact of the blades with the interior of the case prevents the fixed adhesion of the material on the case. By these means the whole of the material in the case is lifted from the bottom to the top twice, and turned from the ends to the center, and from the center to the ends by each revolution of the shaft, and the case freed from adhesions.

What I claim is:—

In a device of the kind described, the combination with a cylindrical case, and rotatable shaft therein, of a double winged blade affixed on the central portion of said shaft said wings being so curved that the outer edge forms a crescent and an arch blade rigidly fixed on the end portions of said shaft within said case, the arch portion of said blade forming a curved hook, and the end portions of said blade forming radial knives, said blades being adapted when said shaft is rotated to scrape the interior of said case, lift the material to be mixed from the bottom of said case to the top twice during each revolution of said shaft, and turn said material alternately from the center to the ends, and from the ends to the center by the curvature of said blades, during each revolution thereof, as described.

NICHOLAS HOLMAN.

Witnesses:
THOMAS J. MORGAN,
GUSTAVE T. FRAENCKEL.

Copies of this patent may be obtained for five cents each, by addressing the "Commissioner of Patents, Washington, D. C."